(12) United States Patent
Kim

(10) Patent No.: US 7,466,094 B2
(45) Date of Patent: Dec. 16, 2008

(54) MOTOR DRIVING APPARATUS, AND INITIAL DRIVING METHOD FOR THREE-PHASE MOTOR

(75) Inventor: Tae-duk Kim, Gyeonggi-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 475 days.

(21) Appl. No.: 11/209,654

(22) Filed: Aug. 24, 2005

(65) Prior Publication Data

US 2006/0043915 A1  Mar. 2, 2006

(30) Foreign Application Priority Data

Aug. 24, 2004  (KR) ...................... 10-2004-0066888

(51) Int. Cl.
*H02P 6/18* (2006.01)
(52) U.S. Cl. ................. 318/400.32; 318/430
(58) Field of Classification Search .............. 318/700, 318/400.01, 400.11, 400.32, 400.33, 400.34, 318/400.35, 430, 431
See application file for complete search history.

(56) References Cited

U.S. PATENT DOCUMENTS

| 4,876,491 | A | * | 10/1989 | Squires et al. ......... 318/400.33 |
|---|---|---|---|---|
| 4,992,710 | A | | 2/1991 | Cassat |
| 5,028,852 | A | * | 7/1991 | Dunfield ............... 318/400.33 |
| 5,254,914 | A | | 10/1993 | Dunfield et al. |
| 5,327,053 | A | | 7/1994 | Mann et al. |
| 5,397,972 | A | | 3/1995 | Maiocchi |
| 5,537,020 | A | * | 7/1996 | Couture et al. ............. 318/720 |
| 5,569,990 | A | | 10/1996 | Dunfield |
| 5,569,994 | A | * | 10/1996 | Taylor et al. ............... 318/700 |
| 5,608,300 | A | * | 3/1997 | Kawabata et al. .......... 318/721 |
| 5,841,252 | A | | 11/1998 | Dunfield |
| 5,854,548 | A | * | 12/1998 | Taga et al. ................ 318/721 |
| 6,100,656 | A | | 8/2000 | El-Sadi et al. |
| 6,791,293 | B2 | * | 9/2004 | Kaitani ................... 318/592 |
| 7,026,774 | B2 | * | 4/2006 | Inaba et al. ............ 318/400.33 |
| 7,334,854 | B1 | * | 2/2008 | Chang et al. ........... 318/400.11 |
| 2008/0067964 | A1 | * | 3/2008 | Maeda et al. .............. 318/474 |

* cited by examiner

*Primary Examiner*—Bentsu Ro
(74) *Attorney, Agent, or Firm*—Sughrue Mion, PLLC

(57) ABSTRACT

The present invention relates to a method of driving a three-phase electric motor, comprising measuring a three-phase excitation current by selectively exciting two phases; calculating a current difference between excitation phase currents having the same phase; classifying the current difference according to variation; and calculating a rotator position in the three-phase motor on the basis of a classification result and the magnitude of the excitation phase current. Thus the present invention provides an electric motor driving apparatus and a driving method which can be applied to various kinds of motors and which precisely measures an initial position of the rotator.

7 Claims, 7 Drawing Sheets

MOTOR DRIVING APPARATUS, AND INITIAL DRIVING METHOD FOR THREE-PHASE MOTOR

CROSS-REFERENCE TO RELATED APPLICATIONS

This application claims the benefit of Korean Patent Application No. 2004-66888, filed on Aug. 24, 2004, in the Korean Intellectual Property Office, the disclosure of which is incorporated herein by reference.

BACKGROUND OF THE INVENTION

1. Field of the Invention

The present invention relates to a motor driving apparatus and an initial driving method for a three-phase motor.

2. Discussion of the Related Art

A phase of a motor excited to obtain the maximum torque is determined according to positions of a rotator. While the rotator rotates, the position of the rotator can be sensed on the basis of a counter electromotive force. Therefore, the phase for the maximum torque is selectively excited according to the sensed position of the rotator, thereby driving the motor.

However, when the motor is initially driven, it is impossible to sense the position of the rotator on the basis of the counter electromotive force, so a position sensor is used. If the phase is not suitably excited according to the positions of the rotator, the motor may fail to be initially driven, take a relatively long time to be driven, and wastefully consume electric power.

In a structure such as a compressor, having a driving environment unsuitable for mounting the position sensor, there have been used various other sensing methods to sense the position of the rotator. For example, the rotator may be forcibly aligned by exciting a stator, and therefore the motor may be driven from the aligned position of the rotator.

Further, there is a method for sensing the initial position of the rotator without the position sensor, which is disclosed in Korean Patent First Publication No. 2000-0024078.

In this method, an excitation phase current is measured a total of six times according to two-phase excitation, and a current difference between the excitation currents measured when the same phase is excited is calculated. At this time, the position of the rotator can be detected on the basis of the calculated current difference, wherein a resoluble angle is an electrical angle of just about 60 degrees.

Further, a difference value between the calculated current differences is calculated on the basis of the calculated difference value when the rotator is placed at a position where there is no current difference between the excitation phase currents, i.e., where there is the minimum magnetic resistance.

However, in this conventional method of measuring the initial position of the rotator, it is difficult to determine the initial position of the rotator in the case of an interior permanent magnet (IPM) type motor that has recently been mostly used in a household motor such as a compressor.

FIG. 1 is a graph showing the excitation phase current difference and the difference value with respect to a mechanical angle according to the positions of the rotator in an IPM type four-pole motor.

Referring to FIG. 1, with regard to points A and B of the mechanical angle, the excitation phase current difference has the same positive and negative signs. Thus, the sign determination of the current difference cannot guarantee the correct measurement for the initial position of the rotator in all kinds of motors. Further, as described above, the resoluble angle reaches about 60 degree, so that it is difficult to precisely measure the position of the rotator.

SUMMARY OF THE INVENTION

Accordingly, it is an aspect of the present invention to provide a motor driving apparatus and an initial motor driving method which precisely measures an initial position of a rotator and can be applied to various kinds of electric motors.

The foregoing and other aspects of the present invention are achieved by providing a method of initially driving a three-phase electric motor, comprising measuring three-phase excitation currents by selectively exciting two phases; calculating a current difference between excitation phase currents having the same phase; classifying the current difference according to certain variations; and calculating a position of a rotator in the three-phase motor on the basis of a classification result and the magnitude of an excitation phase current.

According to an aspect of the present invention, the method further comprises calculating a range of positions of the rotator according to the magnitude of the excitation phase current, and calculating the position of the rotator on the basis of the magnitude of the classification and the magnitude of the excitation phase current, and calculating the position of the rotator by subdividing the position of the rotator within the calculated position range.

According to another aspect of the present invention, the method further comprises calculating the maximum excitation phase current among the detected excitation phase currents when current difference with regard to the three phases is within or below a predetermined reference range; and calculating the position of the rotator on the basis of the calculated maximum excitation phase current.

According to an aspect of the present invention, the method further comprises determining whether a difference between the maximum excitation phase current and the second maximum excitation phase current, among the detected excitation phase currents, is greater than a predetermined critical range when a current difference with regard to the three phases is within or below a predetermined reference range; calculating the sum of two selective current differences between the three-phases when it is determined that the current difference is within the critical range; classifying the current sum according to variations; and calculating the position of the rotator on the basis of the result of the current sum classifications.

According to a further aspect of the present invention, the method further comprises calculating the sum of two selective current differences between the three-phases when a current difference with regard to the three phases is within or below a predetermined reference range; classifying the current sum according to variations; and calculating the position of the rotator on the basis of the result of the current sum classifications.

According to an aspect of the present invention, the method further comprises selecting two phases for excitation according to a rotator position, and transmitting a first Pulse Width Modulation ("PWM") driving signal to an inverter for exciting the selected phases; measuring the excitation phase current according to the first PWM driving signal, and determining whether the measured excitation phase current is greater than a predetermined first reference value; dividing a period of the first PWM driving signal into a first period and a second period when the excitation phase current is higher than the first reference value, and inputting the first PWM driving signal to the inverter during the first period; inputting a second PWM driving signal to the inverter, after inputting the first PWM driving signal to the inverter, in order to commutate rotation of the rotator during the second period; measuring the excitation phase current according to the second PWM driving signal, and determining whether the measured excitation phase current is greater than a predetermined second reference value; measuring the excitation phase current by applying the first and second PWM driving signals to the inverter during the first and second periods, respectively, when the excitation phase current corresponding to the second PWM driving signal is greater than the second reference value; and commutating the three-phase motor when the measured excitation phase current corresponding to the first and second periods is greater than the first reference value and its deviation is within a predetermined range.

According to an aspect of the present invention, the method further comprises selecting two phases for excitation according to the rotator position, and sequentially inputting a PWM driving signal for exciting the selected phases to an inverter; measuring the excitation phase current according to the PWM driving signal; determining whether the measured excitation phase current is greater than a predetermined first reference value; and commutating the three-phase motor when the sequentially measured excitation phase current is greater than the first reference value.

The foregoing and other aspects of the present invention are also achieved by providing a method for initially driving a three-phase motor comprising, measuring a three-phase excitation current by selectively exciting two phases; calculating current difference between excitation phase currents having the same phase; calculating the sum of two selective current differences between the three-phases when a current difference with regard to the three phases is within or below a predetermined reference range; classifying the current sum according to variations; and calculating the position of the rotator on the basis of the result of the current sum classifications.

The foregoing and other aspects of the present invention are also achieved by providing a method of initially driving a three-phase motor employing a rotator comprising, selecting two phases for excitation according to the rotator position, and inputting a first PWM driving signal to an inverter for exciting the selected phases; measuring the excitation phase current according to the first PWM driving signal, and determining whether the measured excitation phase current is greater than a predetermined first reference value; dividing a period of the first PWM driving signal into a first period and a second period when the excitation phase current is greater than the first reference value, and inputting the first PWM driving signal to the inverter during the first period; inputting a second PWM driving signal to the inverter, after inputting the first PWM driving signal to the inverter, in order to commutate rotation of the rotator during the second period; measuring the excitation phase current according to the second PWM driving signal, and determining whether the measured excitation phase current is greater than a predetermined second reference value; measuring the excitation phase current by applying the first and second PWM driving signals to the inverter during the first and second periods, respectively, when the excitation phase current corresponding to the second PWM driving signal is greater than the second reference value; determining whether the measured excitation phase current corresponding to the first and second periods is greater than the first reference value and its deviation is within a predetermined range; and commutating the three-phase motor when the measured excitation phase current corresponding to the first and second periods is greater than the first reference value and its deviation is within a predetermined range.

The foregoing and other aspects of the present invention are also achieved by providing a method for initially driving a three-phase motor employing a rotator comprising, selecting two phases for excitation according to the rotator position, and sequentially inputting a PWM driving signal for exciting the selected phases to an inverter; measuring the excitation phase current according to the PWM driving signal; determining whether the measured excitation phase current is greater than a predetermined first reference value; and commutating the three-phase motor when the sequentially measured excitation phase current is greater than the first reference value.

The foregoing and other aspects of the present invention are also achieved by providing an electric motor driving apparatus comprising a three-phase motor; an inverter outputting excitation phase current for exciting the phases of the three-phase motor in response to input driving signals; a current detector detecting the excitation phase current; and an inverter controller that selectively excites two phases of the three-phase motor by inputting the driving signals to the inverter, calculates current difference between the excitation phase currents having the same phase on the basis of the three-phase excitation phase current detected by the current detector, classifies the calculated current difference according to variations, calculates a rotator position in the three-phase motor on the basis of a classification result and the magnitude of the excitation phase current, and outputs to the inverter the driving signal for exciting two phases to produce the maximum torque.

According to an aspect of the present invention, the inverter controller calculates a position range of the rotator according to variations of the current difference between excitation phase currents having the same phase, and calculates the position of the rotator by subdividing the position of the rotator within the calculated position range which is calculated on the basis of the classification result and the magnitude of the excitation phase current.

According to an aspect of the present invention, the inverter controller calculates the maximum excitation phase current among the detected excitation phase currents when the current difference with regard to the three phases is within or below a predetermined reference range; and calculates the position of the rotator on the basis of the calculated maximum excitation phase current.

According to an aspect of the present invention, the inverter controller determines whether a difference between the maximum excitation phase current and the second maximum excitation phase current, among the detected excitation phase currents, is beyond a predetermined critical range when a current difference with regard to the three phases is within or below a predetermined reference range; calculates the sum of two selective current differences between the three-phases when it is determined that the current difference is within the critical range; classifies the current sum according to variations; and calculates the position of the rotator on the basis of the result of the current sum classifications.

According to an aspect of the present invention, the inverter controller calculates the sum of two selective current differences between the three-phases when current difference, with regard to three phases, is within or below a predetermined reference range; classifies the current sum according to variations; and calculates the position of the rotator on the basis of the result of the current sum classifications.

BRIEF DESCRIPTION OF THE DRAWINGS

The above and/or other aspects and advantages of the present invention will become apparent and more readily appreciated from the following description of the embodiments, taken in conjunction with the accompany drawings of which.

DETAILED DESCRIPTION OF THE INVENTION

Figure 1:
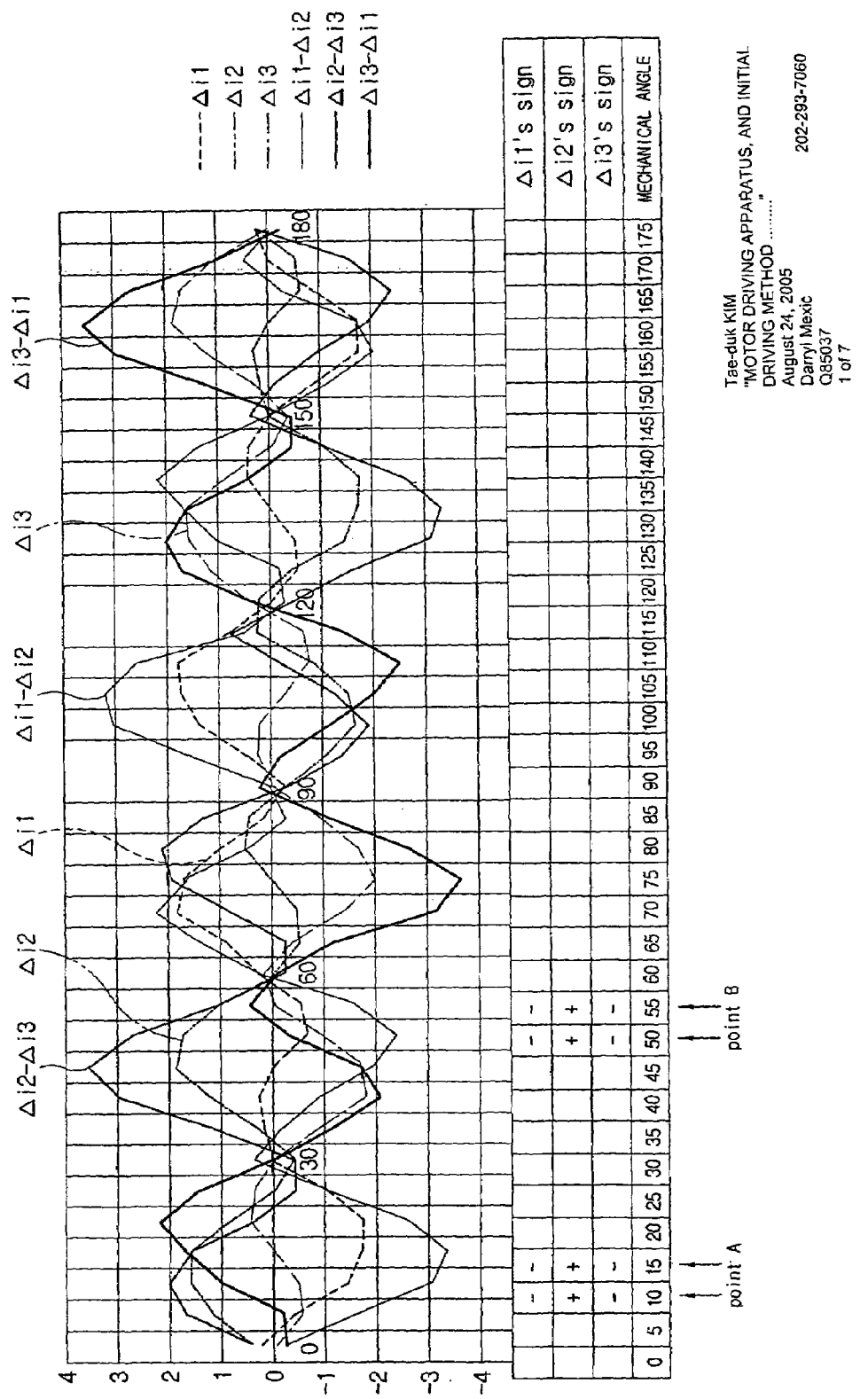
FIG. 1 is a graph showing excitation phase current differences and difference values with respect to a physical rotation angle with respect to rotator positions in an IPM type four-pole motor.

Reference will now be made in detail to the embodiments of the present invention, examples of which are illustrated in the accompanying drawings, wherein like reference numerals refer to like elements throughout. The embodiments are described below in order to explain the present invention by referring to the figures.

Figure 2:
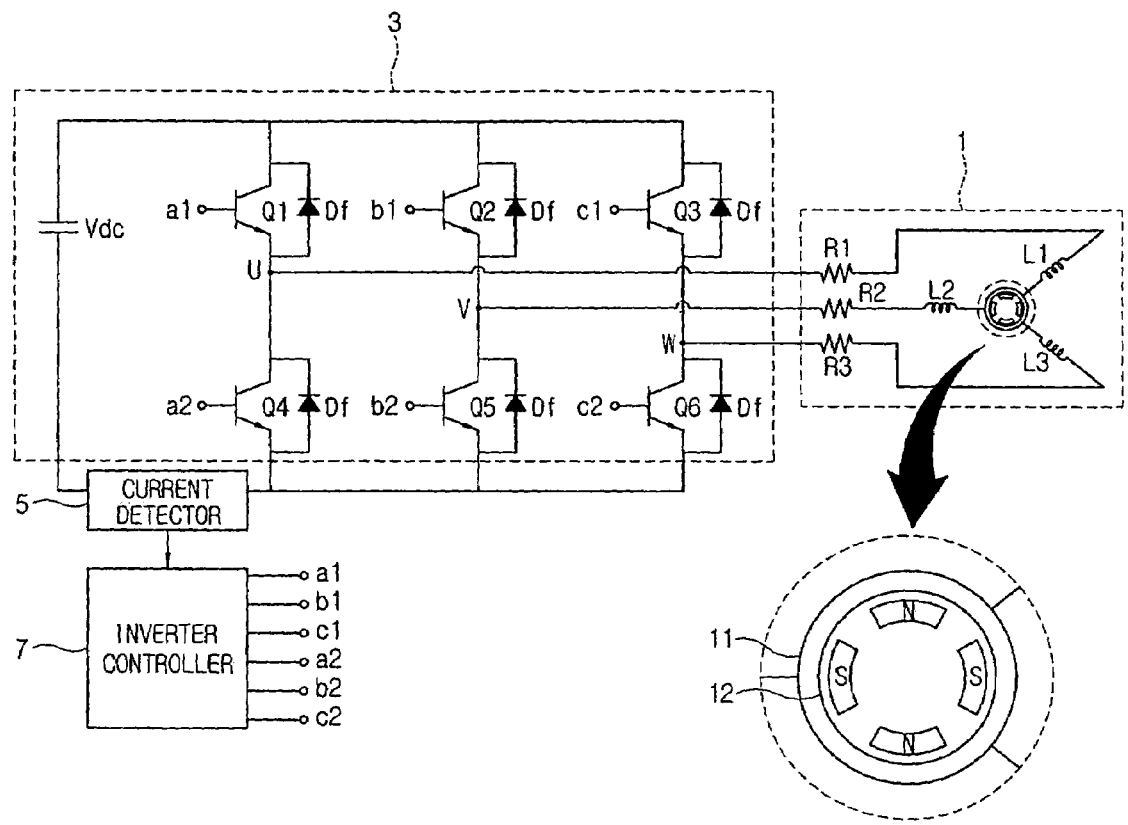
FIG. 2 is a schematic of an electric motor driving apparatus according to an embodiment of the present invention.

FIG. 2 is a schematic configuration of an electric motor driving apparatus according to an embodiment of the present invention. As shown in FIG. 2, the motor driving apparatus comprises a three-phase motor 1, an inverter 3, a current detector 5, and an inverter controller 7.

The three-phase motor 1 comprises a stator 11 having resistors R1~R3, and inductors L1~L3; and an interior rotator 12. In the three-phase motor 1, phase terminals are connected to the inverter 3 and generate a magnetic field when excitation phase currents are introduced and flow into the inductors L1~L3, thereby rotating the interior rotator 12.

The inverter 3 comprises six switching transistors Q1~Q6. The switching transistors Q1~Q6 form three pairs, wherein one pair of switching transistors are connected in series and connected to the phase terminals of the three-phase motor 1. One transistor (hereinafter, referred to as "upper transistor") Q1~Q3 of each pair of switching transistors is connected to a positive voltage terminal of an external power supply, Vdc, and the other transistor (hereinafter, referred to as "lower transistor") is connected to a negative voltage terminal of the external power supply, Vdc.

The excitation phase current supplied from the inverter 3 to the three-phase motor 1 is detected by the current detector 5. Each transistor Q1~Q6 has a base terminal being switched by a bias signal sent from the inverter controller 7.

The inverter controller 7 drives the inverter 3 depending on two-phase excitation. That is, the inverter controller 7 turns on one of three upper transistors Q1~Q3 of the inverter 3, and turns on one of the lower transistors Q4~Q6 having a phase different from the phase of the turned-on upper transistor. According to this phase excitation, directions of six excitation phase currents can be symbolized as the following <Table 1>.

TABLE 1

| Symbol | Current direction |
|--------|-------------------|
| IU     | U → V             |
| IV     | V → W             |
| IW     | W → U             |
| −IU    | V → U             |
| −IV    | W → V             |
| −IW    | U → W             |

Where, the arrow indicates the direction of the current flowing between the phase terminals (U, V, W). For example, "U→V" means that the excitation phase current flowing from the phase terminal (U) of the three-phase motor 1 to the phase terminal (V) thereof.

The inverter controller 7 not only turns on/off the inverter 3, and selectively turns on/off the transistors Q1~Q6 of the inverter 3 on the basis of the current detected by the current detector 5.

Figure 3:
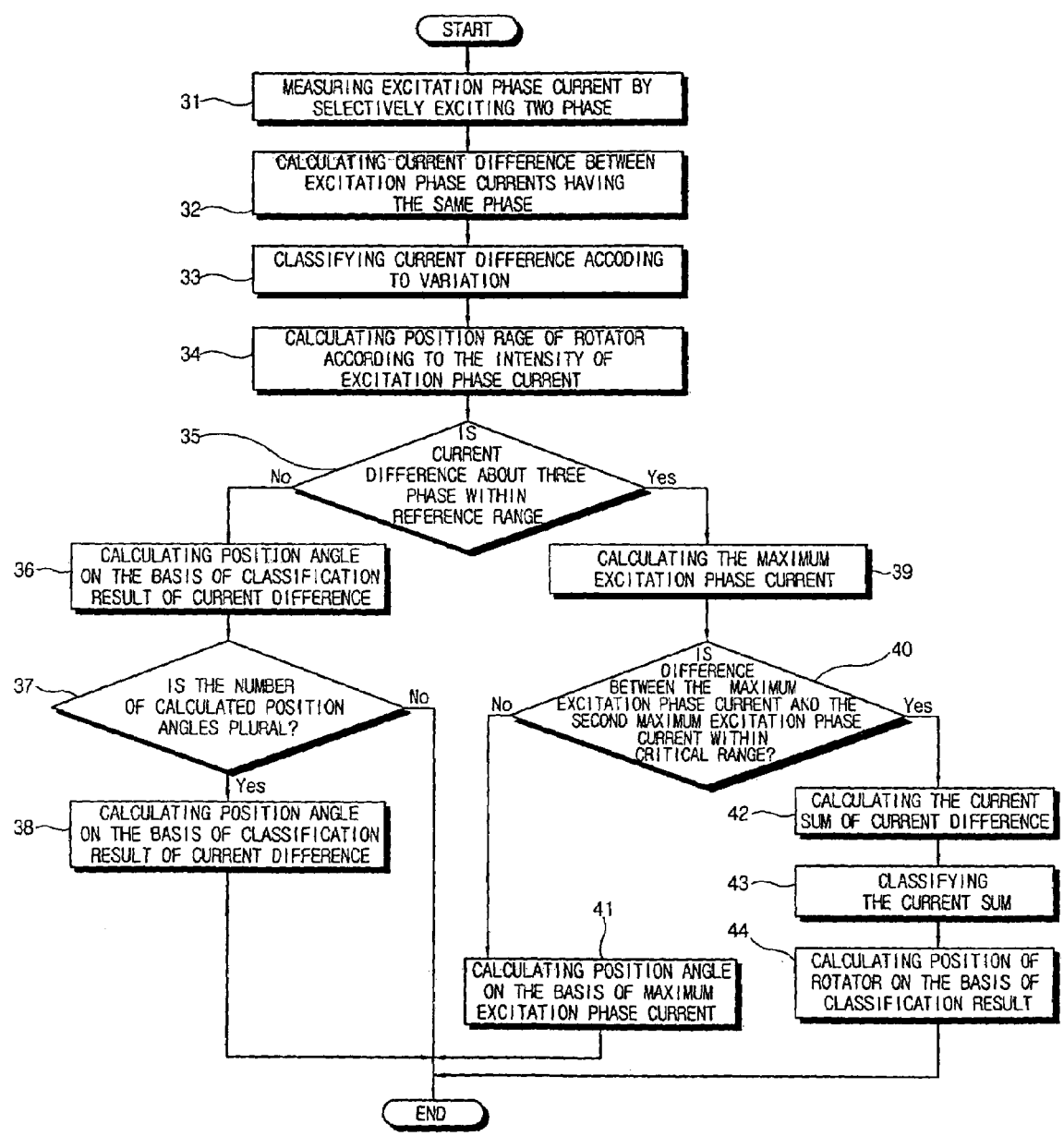
FIG. 3 is a flowchart of calculating an initial position of a rotator in a motor according to an embodiment of the present invention.

FIG. 3 is a flowchart showing the calculation of an initial position of the rotator 12 in the motor according to an embodiment of the present invention.

Hereinbelow is described the method of having the inverter controller 7 calculate the initial position of the rotator 12 on the basis of the detected current and to drive the rotator 12.

First, the inverter controller 7 drives the inverter 3 according to two-phase excitation, thereby supplying the excitation phase current shown in <Table 1> to the three-phase motor 1. At operation 31, the current detector 5 detects magnitude of the excitation phase current, thereby outputting the magnitude to the inverter controller 7.

At operation 32, the inverter controller 7 calculates the current difference between in-phase excitation currents among the excitation phase currents. That is, in <Table 1>, IU and −IU, IV and −IV, and IW and −IW are the in-phase excitation currents with respect to each other, but have opposite current directions with respect to each other.

Hence, the current difference between the in-phase excitation currents is defined as follows.

$$\Delta I1 = IU - (-IU), \Delta I2 = IV - (-IV), \Delta I3 = IW - (-IW)$$

At operation 33, the current difference is classified according to variation. The classification is performed similar to the quantization of an analog signal according to levels. Here, the number of quantized levels is optimally determined when the system is designed, which has an effect on a resoluble angle with respect to the positions of the rotator 12 (described below).

Hereinbelow, an embodiment of the present invention will be described on the assumption that the current difference is classified into "−1", "0", "1". As references for the classification, "−1" indicates a case where the current difference is less than a reference range, "0" indicates a case where the current difference is within the reference range, and "1" indicates a case where the current difference is greater than the reference range.

Figure 4:
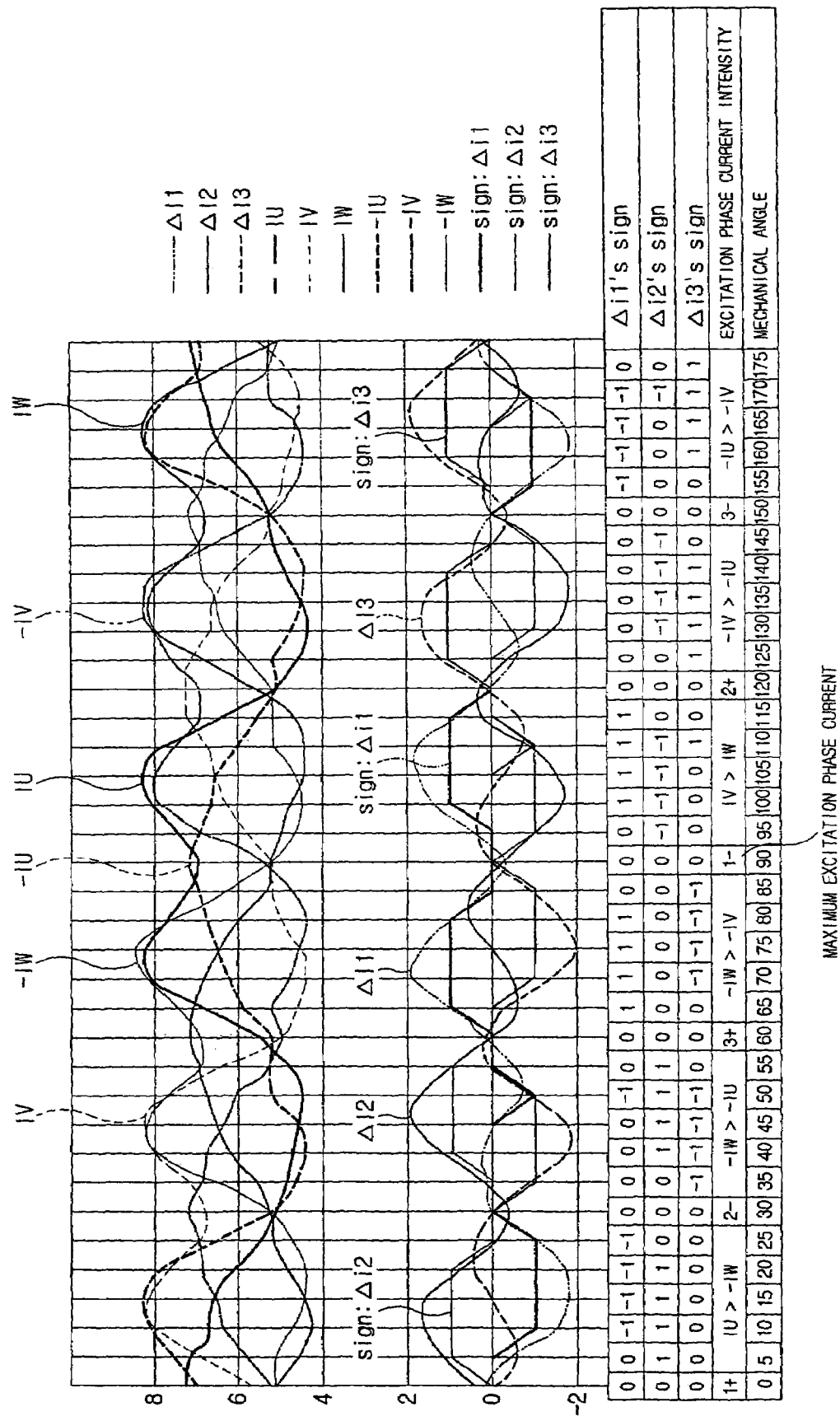
FIG. 4 is a graph showing excitation phase current, current difference, and a classification result of the current difference which correspond to the physical rotation angle in the four-pole motor.

FIG. 4 is a graph showing excitation phase current, current difference, and a classification result of the current difference in correspondence with the physical rotation angle of the four-pole motor.

At operation 34 of FIG. 3, the rotation angle has a predetermined characteristic with regard to the magnitude of the excitation phase current within the 30-degree position range of the rotator 12. That is, IU is always greater than –IW within the range of 0~30 degree, and –IW is always greater than –IU within the range of 30~60.

In more detail, the classification result of the current difference represented as a sign (positive or negative) is divided according to angles, at operation 36. Generally, the angles are categorized according to the combinations of the signs besides duplication appearing at several angles.

At operation 37, duplicated angles are distinguished. At operation 38, inherent information about the current magnitude or the like for each range is compared. For example, the following references shown in <Table 2> can be applied to distinguish the duplicated angles at 10 degrees, 15 degrees, and 20 degrees.

| Angle | Distinction |
|---|---|
| 10 degrees | IU > –IV and –IW > IW |
| 15 degrees | IU = –IV and –IW = IW |
| 20 degrees | IU < –IV and –IW < IW |

These values are specified at the referenced angles shown in the graph of FIG. 4, which are previously stored and used as the determination references.

Meanwhile, at operation 35, three current differences, i.e., ΔI1, ΔI2, and ΔI3 may all be limited to small values. This is the case where the current differences are all classified into the "0" range. The value of each current difference can be calculated as a predetermined reference value approximately equal to or less than 0. When this condition is satisfied, magnetic resistance is at a minimum value.

According to an embodiment of the present invention, three current differences at the rotation angles of 0, 30, 60, 90, 120, 150 degrees, according to the position of the rotator 12, are all classified into the "0" range. Here, at operation 41, as a new reference to classify these angles, the maximum excitation phase current can be selected as a determination base.

That is, as shown in FIG. 4, the maximum excitation phase current is IU at the angle of 0 degrees, but IW is the maximum at the angle of 60 degrees. Thus, the excitation phase currents detected by the current detector 5 are compared by the inverter controller 7, thereby classifying the rotation angles according to the rotator position.

However, because an error may occur in classifying the rotational angles, at operation 40, it is preferable to use an alternative method when the difference between the maximum excitation phase current and the second maximum excitation phase current is within a predetermined error range, or a critical range.

For an alternative method, at operation 42, the current sum of the current difference between the excitation phase currents is calculated and used. At operation 43, the calculated current sum can be classified as a "–1", "0" and "1" range, similar to the current difference.

The method of detecting the position of the rotator 12 using the current sum can be applied when three current differences are all limited to small values of a predetermined reference range or below, for example, when the current differences are all classified into the "0" range.

Figure 5:
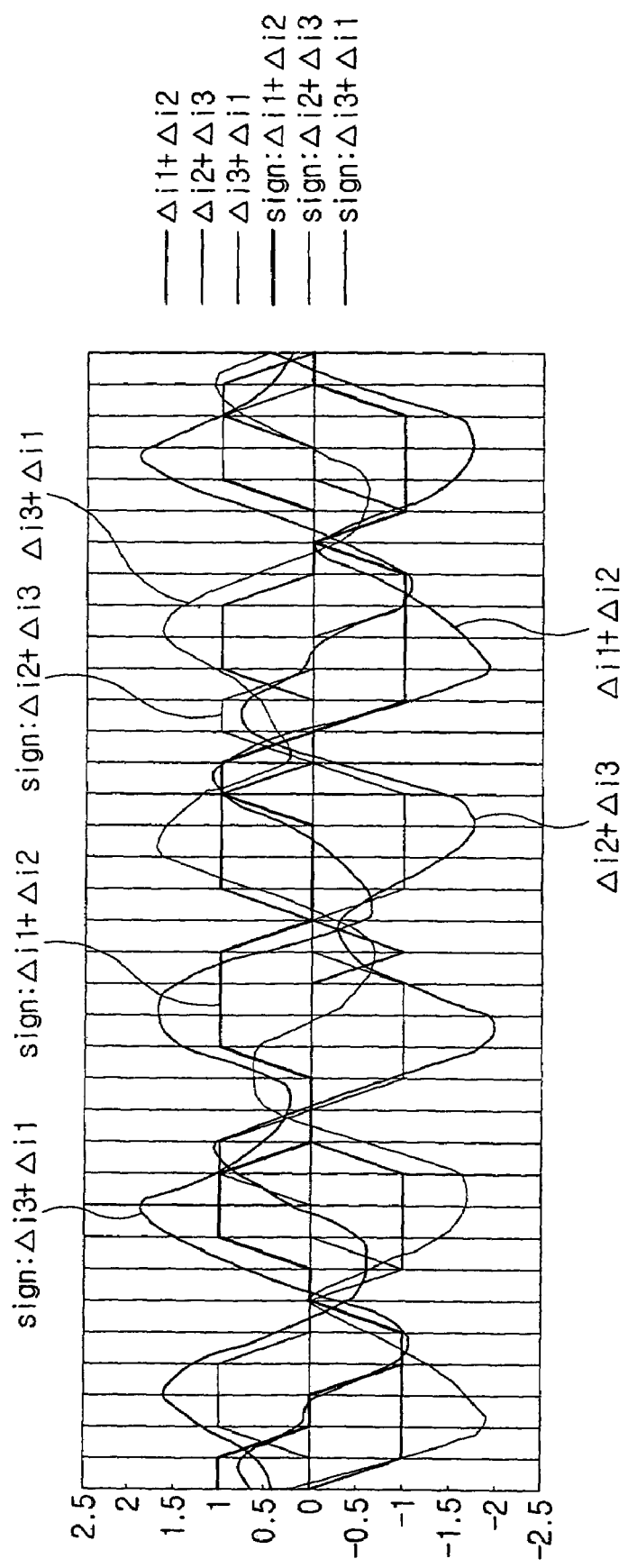
FIG. 5 is a graph showing the current sum and the resulting classification (i.e., positive or negative) which correspond to the physical rotation angle based on the graph of FIG. 4.

FIG. 5 is a graph showing the sum of currents and the classification results corresponding to the rotation angle based on the graph of FIG. 4.

Referring to FIG. 5, the sum of ΔI2 and ΔI3 is classified into the "0" range at the angle of 30 degree and the "1" range at the angle of 120 degree. Thus, at operation 44, the more reliable rotation angle, i.e., the position of the rotator 12, can be calculated at the minimum magnetic resistances R1~R3.

In the foregoing method, a proper control driving signal corresponding to the position of the rotator 12 is transmitted to the inverter 3 on the basis of information about the calculated position of the rotator 12, thereby driving to the electric motor.

In the case of the electric motor that is initially driven, the specific synchronization/acceleration drive is performed until an electromotive force applied to a motor winding wire, due to rotation of the rotator 12, reaches or exceeds a predetermined value. In the foregoing two-phase excitation, the number of selectable switching methods is six as shown in <Table 1>, and the inverter controller 7 excites two phases allowing the rotation of the electric motor to generate the maximum torque.

At this time, commutation according to the foregoing six switching methods is performed, wherein the algorithm for the commutation is as follows.

Figure 6:
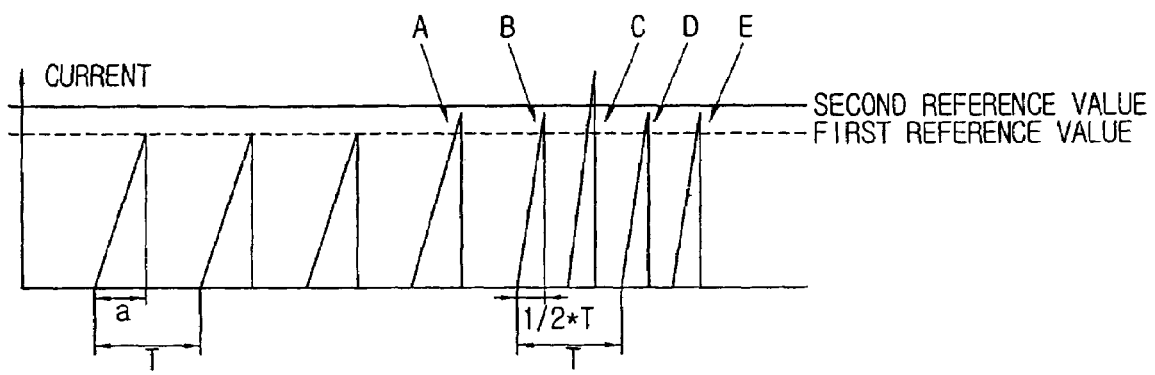
FIG. 6 is a graph showing the excitation phase current with respect to time wherein the excitation phase current is supplied to a three-phase motor by a pulse width modulation (PWM) signal transmitted from an inverter controller to an inverter.

FIG. 6 is a graph showing the excitation phase current with respect to time, wherein the excitation phase current is supplied to the three-phase motor 1 by a pulse width modulation (PWM) driving signal transmitted from the inverter controller 7 to an inverter 3.

The PWM signal has a "period" of "T", an "on-time" of "a", and a "duty ratio" of "a/T". In the PWM driving signal, the corresponding current detected by the current detector 5 has a triangular waveform.

As shown in FIG. 6, the previous three triangular waves reach a maximum value that is less than or equal to a first reference value. If the triangular wave "A" reaches a maximum value which is greater than the first reference value, as seen in the fourth triangular wave, the inverter controller 7 applies a driving pulse to the transistors Q1~Q6 of the inverter 3 wherein the driving pulse has a period that is half of the period "T" of the PWM driving signal. This keeps the duty ratio constant.

In the case where the period of the PWM driving signal is divided in half into a first period and a second period, a first PWM driving signal is transmitted to the transistors Q1~Q6 to keep the phase excited in the first period, and a second PWM driving signal is transmitted to the transistors Q1~Q6 to be selectively turned on to excite the next phase.

The inverter controller 7 determines the magnitude of current triangular waves "B" and "C", as detected by the current detector 5 in response to the driving pulse. When the current "C" is beyond a second reference value, which is greater than the first reference value, the first and second PWM driving signals are repeatedly outputted in the first and second periods of the next period as the driving signal.

Further, the inverter controller 7 compares the excitation phase current triangular waves "D" and "E", as detected by the current detector 5.

As a result of this comparison, where the detected excitation phase currents are higher than the first reference value and its maximum value has a deviation within a predetermined range, the commutation is performed by the following sequence. On the other hand, if the detected and compared excitation phase currents have a maximum value greater than the predetermined range, the inverter 5 is driven to change into the sequence of the previous triangular wave signals "B" and "C".

Until the conditions resulting from the triangular wave signals "B" and "C" are satisfied, the driving signal is repeatedly inputted. When the conditions are satisfied, the inverter 3 is controlled to operate by the same mode as used to produce the triangular wave signals "D" and "E".

Figure 7:
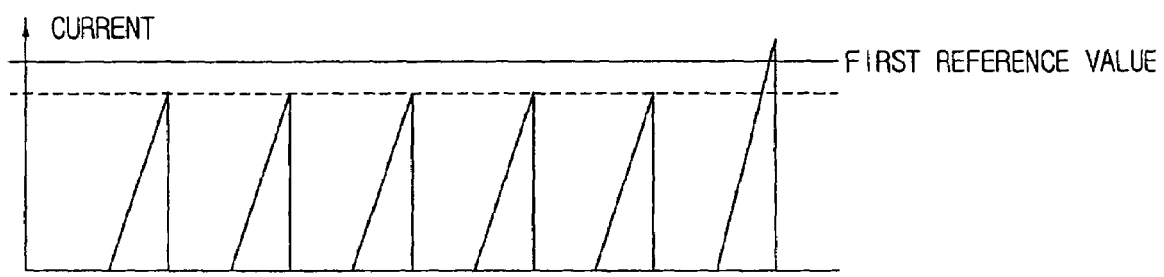
FIG. 7 is a graph showing the excitation phase current with respect to time, wherein the excitation phase current is measured with respect to a driving pulse.

FIG. 7 is a graph showing the excitation phase current with respect to time, wherein the excitation phase current is measured with respect to the driving pulse, which illustrates another commutation method according to an embodiment of the present invention.

Contrary to FIG. 6, in FIG. 7 the inverter controller 7 applies a PWM driving signal having a constant duty ratio to the inverter 3. Here, the current detected by the current detector 5 has the triangular waveform.

The inverter controller 7 determines the commutation when the maximum value of the excitation phase current detected by the current detector 5 is greater than the first reference value, and then excites the phases according to the following sequence.

According to the commutation method referring to FIGS. 6 and 7, noise due to continuous driving of the conventional hard switching is decreased to a noise level associated with soft switching.

As described above, the present invention provides an electric motor driving apparatus and an initial driving method, in which correct commutation is performed due to normal rotation so that the electric motor can be driven by a low driving current, thereby reducing both power consumption and noise.

Although a few representative embodiments of the present invention have been shown and described, it will be appreciated by those skilled in the art that changes may be made to these embodiments without departing from the principles and spirit of the invention, the scope of which is defined in the appended claims and their equivalents.

What is claimed is:

1. A method of initially driving a three-phase electric motor, comprising:
   measuring a three-phase excitation current by selectively exciting two phases;
   calculating a current difference between excitation phase currents having the same phase;
   classifying the current difference according to a variation; and
   calculating a rotator position on the basis of a classification result and the magnitude of the excitation phase current.

2. The method according to claim 1, further comprising calculating a position range of the rotator according to the magnitude of the excitation phase current,
   calculating the position of the rotator on the basis of the magnitude of the classification and the magnitude of the excitation phase current, and
   subdividing the position of the rotator within the calculated position range.

3. The method according to claim 1, further comprising:
   calculating the maximum excitation phase current among the detected excitation phase currents when a current difference with regard to the three phases is within or below a predetermined reference range; and
   calculating the position of the rotator on the basis of the calculated maximum excitation phase current.

4. The method according to claim 1, further comprising:
   determining whether a difference between the maximum excitation phase current and a second maximum excitation phase current among the detected excitation phase currents is greater than a predetermined critical range when a current difference with regard to the three phases is within or below a predetermined reference range;
   calculating the sum of two selective current differences between the three-phases when it is determined that the current difference is within the critical range;
   classifying the current sum according to variations; and
   calculating the position of the rotator on the basis of the result of the current sum classification.

5. The method according to claim 1, further comprising:
   calculating the sum of two selective current differences between the three-phases when a current difference with regard to the three phases is within or below a predetermined reference range;
   classifying the current sum according to variations; and
   calculating the position of the rotator on the basis of the result of the current sum classification.

6. The method according to claim 1, further comprising:
   selecting two phases for excitation according to the rotator position, and transmitting a first Pulse Width Modulation ("PWM") driving signal to an inverter for exciting the selected phases;
   measuring an excitation phase current according to the first PWM driving signal and determining whether the measured excitation phase current is greater than a predetermined first reference value;
   dividing a period of the first PWM driving signal into a first period and a second period when the excitation phase current is greater than the first reference value and inputting the first PWM driving signal to the inverter during the first period;
   inputting a second PWM driving signal to the inverter, after inputting the first PWM driving signal to the inverter, in order to commutate rotation of the rotator during the second period;
   measuring the excitation phase current according to the second PWM driving signal, and determining whether the measured excitation phase current is greater than a predetermined second reference value;
   measuring the excitation phase current by applying the first and second PWM driving signals to the inverter during the first and second periods, respectively, when the excitation phase current corresponding to the second PWM driving signal is greater than the second reference value; and
   commutating the three-phase motor when the measured excitation phase current corresponding to the first and second periods is greater than the first reference value and its deviation is within a predetermined range.

7. The method according to claim 1, further comprising:
   selecting two phases for excitation according to the rotator position, and sequentially inputting a PWM driving signal for exciting the selected phases to an inverter;
   measuring the excitation phase current according to the PWM driving signal;
   determining whether the measured excitation phase current is greater than a predetermined first reference value; and
   commutating the three-phase motor when the sequentially measured excitation phase current is greater than the first reference value.

* * * * *